US009460837B2

(12) United States Patent
Son et al.

(10) Patent No.: US 9,460,837 B2
(45) Date of Patent: Oct. 4, 2016

(54) GAP COMPOSITION OF MULTI LAYERED POWER INDUCTOR AND MULTI LAYERED POWER INDUCTOR INCLUDING GAP LAYER USING THE SAME

(75) Inventors: Soo Hwan Son, Seoul (KR); Sung Yong An, Gyeonggi-do (KR); Myeong Gi Kim, Gyeonggi-do (KR); So Yeon Song, Gyeonggi-do (KR); Byeong Cheol Moon, Seoul (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 38 days.

(21) Appl. No.: 13/536,503

(22) Filed: Jun. 28, 2012

(65) Prior Publication Data

US 2013/0002389 A1 Jan. 3, 2013

(30) Foreign Application Priority Data

Jun. 28, 2011 (KR) ........................ 10-2011-0062945

(51) Int. Cl.
*H01F 5/00* (2006.01)
*C04B 35/26* (2006.01)
(Continued)

(52) U.S. Cl.
CPC ................ *H01F 3/14* (2013.01); *H01F 37/00* (2013.01); *H01F 27/292* (2013.01); *H01F 2027/2809* (2013.01)

(58) Field of Classification Search
CPC .......... C04B 2235/3244; C04B 35/10; C04B 35/62805; C04B 35/62807; C04B 2235/768; C04B 35/49; C04B 35/62823; H01G 4/105; H01G 4/12; H01G 4/1236; H01H 5/00
USPC .............. 336/199, 200, 221, 232; 361/301.4, 361/321.5; 501/139, 136; 428/403, 842.8; 252/62.58
See application file for complete search history.

(56) References Cited

U.S. PATENT DOCUMENTS 3,457,174 A * 7/1969 Deschamps et al. ...... 252/62.57
3,645,898 A * 2/1972 Klerk et al. ............... 252/62.59
(Continued)

FOREIGN PATENT DOCUMENTS

JP 10-229016 A 8/1998
JP 2004-104093 A 4/2004
(Continued)

OTHER PUBLICATIONS

Office Action issued in Korean Application No. 10-2011-0062945 dated Dec. 26, 2012.
(Continued)

*Primary Examiner* — Alexander Talpalatski
*Assistant Examiner* — Joselito Baisa
(74) *Attorney, Agent, or Firm* — McDermott Will & Emery LLP

(57) ABSTRACT

Disclosed are a multilayered power inductor, including: a body in which a plurality of magnetic layers formed with inner electrodes are stacked; and a plurality of gap layers, wherein the plurality of gap layers are formed so as not to contact external electrodes formed at both sides of the body, and a gap composition of the multilayered power inductor. In addition, as the gap composition, the exemplary embodiment of present invention can prepare tetravalent or tetravalent dielectric oxide into the paste type and applies the gap layer structure thereto, thereby facilitating the structural design and the thickness control of the gap layer as compared with the case of forming the gap layer in the sheet shape of the related art and improving the DC-bias characteristics by maximally suppressing the diffusion with the body.

5 Claims, 5 Drawing Sheets

(51) Int. Cl.

| | |
|---|---|
| ***G11B 5/708*** | (2006.01) |
| ***H01F 3/14*** | (2006.01) |
| ***H01F 37/00*** | (2006.01) |
| *H01F 27/29* | (2006.01) |
| *H01F 27/28* | (2006.01) |

(56) References Cited

U.S. PATENT DOCUMENTS

| | | | | |
|---|---|---|---|---|
| 5,846,507 | A * | 12/1998 | Liu | C01C 1/0411 423/362 |
| 6,656,590 | B2 * | 12/2003 | Venigalla et al. | 428/403 |
| 6,733,740 | B1 * | 5/2004 | Costantino et al. | 423/598 |
| 6,779,250 | B2 * | 8/2004 | Ahn | H01F 17/0033 257/E27.046 |
| 7,147,835 | B2 * | 12/2006 | Seo | C01G 23/003 361/321.1 |
| 7,671,715 | B2 * | 3/2010 | Iwase | 336/200 |
| 8,004,381 | B2 * | 8/2011 | Katayama | H01F 17/0013 252/62.6 |
| 8,018,313 | B2 * | 9/2011 | Tada et al. | 336/200 |
| 8,524,190 | B2 * | 9/2013 | Hill | C01G 49/0018 252/62.62 |
| 2003/0235689 | A1 * | 12/2003 | Rafaniello | B82Y 25/00 428/403 |
| 2007/0020489 | A1 * | 1/2007 | Yamazaki | B82Y 30/00 428/842.8 |
| 2008/0101979 | A1 * | 5/2008 | Kato | H01F 1/36 420/8 |
| 2009/0051476 | A1 | 2/2009 | Tada et al. | |
| 2010/0033286 | A1 | 2/2010 | Katayama et al. | |
| 2011/0095856 | A1 * | 4/2011 | Nakajima | B32B 18/00 336/177 |
| 2013/0285874 | A1 * | 10/2013 | Hill | C04B 35/64 343/852 |

FOREIGN PATENT DOCUMENTS

| | | | |
|---|---|---|---|
| JP | 2004-182554 | A | 7/2004 |
| JP | 2006-339532 | | 12/2006 |
| JP | 2007-088914 | A | 4/2007 |
| JP | 2009-094149 | A | 4/2009 |
| KR | 2008-0091778 | A | 10/2008 |
| KR | 10-2011-0018954 | | 2/2011 |
| WO | 2007/088914 | A1 | 8/2007 |
| WO | 2008/004633 | A1 | 10/2008 |

OTHER PUBLICATIONS

Japanese Office Action issued in Application No. 2012-143917 dated Apr. 30, 2013.

Notice of Office Action issued in corresponding Japanese Patent Application No. 2013-156385, mailed on Mar. 8, 2016; with English translation.

* cited by examiner

- PRIOR ART -

GAP COMPOSITION OF MULTI LAYERED POWER INDUCTOR AND MULTI LAYERED POWER INDUCTOR INCLUDING GAP LAYER USING THE SAME

CROSS REFERENCE(S) TO RELATED APPLICATIONS

This application claims the benefit under 35 U.S.C. Section 119 of Korean Patent Application Serial No. 10-2011-0062945, entitled "Gap Composition Of Multi Layered Power Inductor And Multi Layered Power Inductor Including Gap Layer Using The Same" filed on Jun. 28, 2011, which is hereby incorporated by reference in its entirety into this application.

BACKGROUND OF THE INVENTION

1. Technical Field

The present invention relates to a gap composition of a multilayered power inductor and a multilayered power inductor including a gap layer using the same.

2. Description of the Related Art

A multilayered power inductor has been mainly used for a power supply circuit such as a DC-DC converter within portable devices. Meanwhile, the multilayered power inductor has been developed to implement high current, low DC resistance, or the like, while being miniaturized. As a demand for high frequency and miniaturization of the DC-DC converter is increased, the use of the multilayered power inductor has been suddenly increased, instead of the existing wound choke coil.

The multilayered power inductor suppresses magnetic saturation of the inductor in terms of a material and a structure and thus, may be operated at high current. As compared with the wound power inductor, the multilayered power inductor increases a change in a value of inductance L according to applied current but may be manufactured in a small size and may lower a thickness and is advantageous in terms of DC resistance.

The structure of the general multilayered power inductor currently used is shown in FIG. 1. Referring to FIG. 1, the multilayered power inductor includes an inner electrode 10, a body 20 using a ferrite material, and a gap layer 30 in the body 20. The gap layer is inserted into the body to block a magnetic flux, which serves to reduce a change value in inductance according to applied current. The gap layer is sintered at about 900° C. and then, an external electrode 40 is formed and a plating layer 50 is formed using Ni, Sn, or the like, thereby finally manufacturing a multilayered power inductor.

The gap layer 30 of the general multilayered power inductor is formed by molding a sheet between inner electrode layers on a single plane and then, stacking a plurality of layers. In addition, the gap layer 30 extends to the external electrodes 40 formed at both outsides of the body 20. Therefore, the gap layer 30 contacting the external electrode 40 may be delaminated during a sintering process.

Generally, a magnetic structure of a magnetic circuit is broken by a non-magnetic body or an air gap, such that a magnitude in flowing magnetic flux is reduced due to the increase in magnetic resistance. Therefore, effective permeability is reduced and inductance is reduced accordingly. However, the change rate of the value of the inductance L is very small.

Therefore, in the general inductor, the change in inductance is directly proportional to the permeability. On the other hand, in the inductor having the gap layer, the influence of inductance according to the change in permeability is greatly suppressed. Therefore, DC-bias characteristics of the power inductor may be greatly improved by inserting the gap layer. However, when a product substantially uses the inductor, the inductor needs to satisfy DC-bias characteristics at room temperature and DC-bias characteristics (hereinafter, bias-TCL) according to a temperature change (−50 to −125° C.) such as below zero temperature and high temperature.

However, in the case of the power inductor including the gap layer having the structure according to the related art, temperature stability may be degraded due to the change in the inductance value according to the applied current by changing temperature.

The non-magnetic body used as the current multilayered power inductor gap material uses ferrite composition similar to the magnetic material configuring the body but mainly uses Zn—Cu based ferrite that does not contain NiO so as to remove magnetism. However, the Zn—Cu based ferrite has different temperature characteristics due to diffusion according to the temperature. A need exists for a gap material capable of improving the Bias-TCL characteristics.

Further, a need exists for a development of a new gap material and a development of a multilayered power inductor having a new structure capable of improving the Bias-TCL characteristics.

SUMMARY OF THE INVENTION

An object of the present invention is to provide a multilayered power inductor having a new gap layer structure capable of solving a problem of delamination of a gap layer during a sintering process in a power inductor including the gap layer of the related art and improving Bias-TCL characteristics due to a change in temperature.

In addition, another object of the present invention is to provide a material composition for a new gap layer capable of solving a problem of degrading Bias-TCL characteristics when using a material of a gap layer of the related art.

According to an exemplary embodiment of the present invention, there is provided a multilayered power inductor, including: a body in which a plurality of magnetic layers formed with inner electrodes are stacked; and a plurality of gap layers, wherein the plurality of gap layers are formed so as not to contact external electrodes formed at both sides of the body.

The plurality of gap layers may be spaced apart from the external electrodes at an interval of 100 μm or more.

The plurality of gap layers may be formed in a core area surrounded by the inner electrodes.

The plurality of gap layers may be formed in the same area as an area in which the inner electrodes at both sides are positioned.

The inner electrode may be one or more selected from a group consisting of Ag, Cu, and an alloy thereof.

The body may be NiZnCu ferrite.

The gap layer may be printed in a paste type.

According to another exemplary embodiment of the present invention, there is provided a gap composition of a multilayered power inductor using dielectric oxide that does not react with ferrite.

The dielectric oxide may be trivalent or tetravalent metal oxide.

The dielectric oxide may be one or more selected from a group consisting of $Al_2O_3$, $TiO_2$, $ZrO_2$, $SnO_2$, and $CeO_2$.

An average particle size of the dielectric oxide may be 0.01 to 0.1 μm and a specific surface area may be 10.0 to 50.0 $m^2$/g.

The dielectric oxide may be included at 20 to 70 wt % for the entire gap composition.

The gap composition may be a paste type.

The viscosity of the paste may be 10 to 150 kcps.

The gap composition of the multilayered power inductor may further include one or more selected from a group consisting of organic resin, solvent, and additives.

DESCRIPTION OF THE PREFERRED EMBODIMENTS

Hereinafter, the present invention will be described in more detail.

Terms used in the present specification are for explaining the embodiments rather than limiting the present invention. Unless explicitly described to the contrary, a singular form includes a plural form in the present specification. The word “comprise” and variations such as “comprises” or “comprising,” will be understood to imply the inclusion of stated constituents, steps, operations and/or elements but not the exclusion of any other constituents, steps, operations and/or elements.

An exemplary embodiment of the present invention relates to a multilayered power inductor having a new gap layer structure and a gap composition for forming the gap structure.

1. Multilayered Power Inductor

A multilayered power inductor according to an exemplary embodiment of the present invention includes a body in which a plurality of magnetic layers provided with inner electrodes are stacked and a plurality of gap layers, wherein the plurality of gap layers are formed so as not to contact external electrodes formed at both sides of the body.

Figure 2:
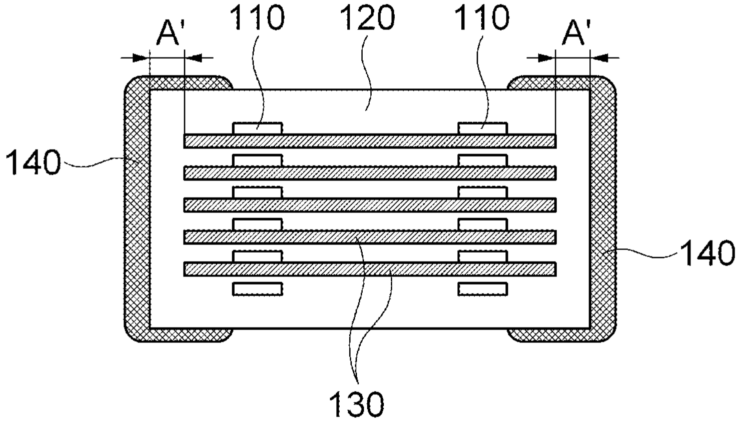
FIGS. 2 to 4 are diagrams showing a structure of a multilayered power inductor including a new gap structure according to first to third exemplary embodiments of the present invention.

Next, FIG. 2 is a structure showing a multilayered power inductor including a new gap layer structure according to a first exemplary embodiment of the present invention. Referring to FIG. 2, the multilayered power inductor includes a body 120 in which a plurality of magnetic bodies provided with inner electrodes 110 are stacked and a plurality of gap layers 130, wherein the plurality of gap layers 130 are formed so as not to contact the external electrodes 140 formed at both sides of the body 120.

The plurality of gap layers 130 may be formed so as to be spaced apart from the external electrode 140 at a predetermined interval A', preferably, at an interval of about 100 μm or more. The reason is that the gap layer 130 may be delaminated at the time of sintering in the case in which the gap layer 130 contacts the external electrode 140. Therefore, in order to solve the delamination problem of the gap layer 130 at the time of sintering, the exemplary embodiment of the present invention may space the gap layer 130 from the external electrode 140 by 100 μm or more.

Figure 3:
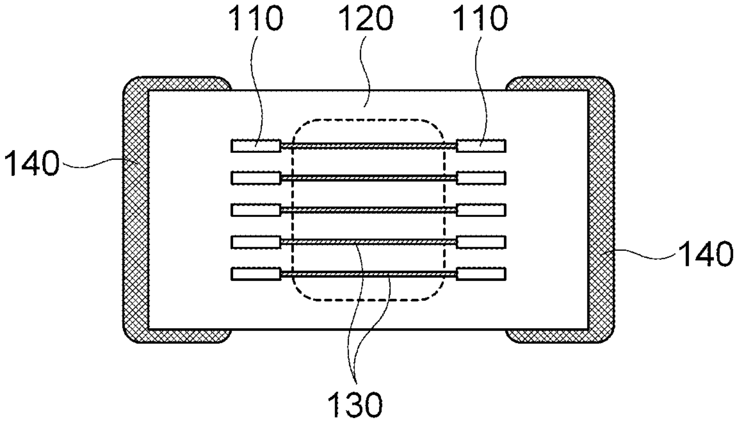

Next, FIG. 3 is a structure showing a multilayered power inductor including a new gap layer structure according to a second exemplary embodiment of the present invention. Referring to FIG. 3, the multilayered power inductor includes the body 120 in which the plurality of magnetic bodies provided with the inner electrodes 110 are stacked and the plurality of gap layers 130, wherein the plurality of gap layers 130 may be partially formed only in a core area surrounded by the inner electrode 110. The structure does not cause the problem since the gap layer 130 is disposed only in the area (core) surrounded by the inner electrode 110 such that the outside of the gap layer 130 is completely covered with the magnetic body, that is, the body 120 so as not to be exposed to the external magnetic flux.

Figure 4:
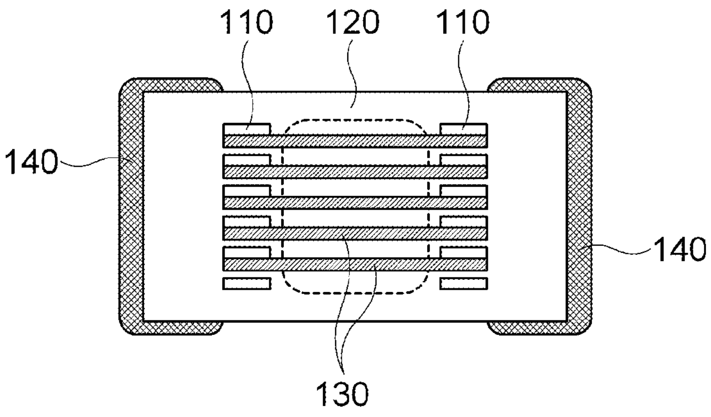

Further, FIG. 4 is a structure showing a multilayered power inductor including a new gap layer structure according to a third exemplary embodiment of the present invention. Referring to FIG. 4, the multilayered power inductor includes the body 120 in which the plurality of magnetic bodies provided with the inner electrodes 110 are stacked and the plurality of gap layers 130, wherein the plurality of gap layers 130 may be partially formed only in the same area as the area in which inner electrodes 110 at both sides are disposed. The structure forms the gap layer 130 up to the circumference of the inner electrode 110 and the area (core) surrounded by the inner electrode 110.

Figure 1:
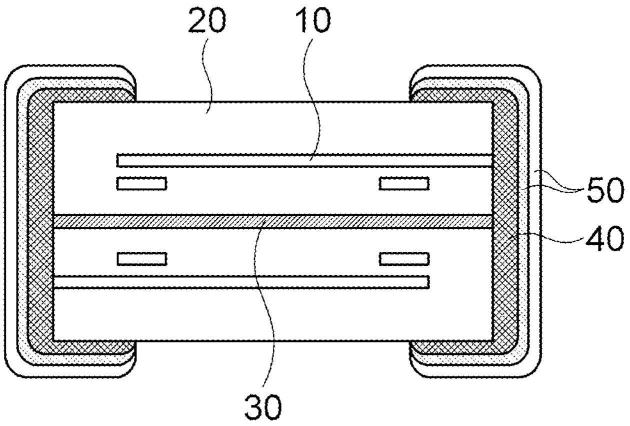
FIG. 1 is a diagram showing a structure of a general multilayered power inductor including a gap layer.

As shown in FIG. 1, the exemplary embodiment of the present invention does not form the gap layer so as to reach the external electrodes at both sides using a single layer of sheet that is a general type but partially forms the gap layer at a position at which the external electrodes formed at both sides of the body do not substantially contact each other. When the gap layer is formed in a sheet type as in the related art, it is cumbersome in that the gap layer is formed and then, the gap layer formed in the unwanted area is again cut.

However, the gap layer according to the exemplary embodiment of the present invention is partially formed in an area spaced apart from the external electrode by a predetermined interval, the same area as the inner electrode, and the core area surrounded by the inner electrode. In this case, the gap material may be formed by a printing method using paste. In this case, the degree of freedom in a type and a thickness of the gap layer is very high as compared with the sheet state according to the related art and the thickness and type (area) of the gap is controlled, thereby manufacturing the excellent products having the DC-bias characteristics.

In the multilayered power inductor of the exemplary embodiment of the present invention, the inner electrode may be one or more selected from a group consisting of Ag, Cu, and an alloy thereof. Among those, Ag or Cu may be more preferably used.

The body may be a magnetic layer made of NiZnCu ferrite.

2. Gap Composition of Multilayered Power Inductor

The exemplary embodiment of the present invention is to provide the gap composition so as to effectively provide the multilayered power inductor through the above-mentioned gap layer structure formation.

The gap composition of the multilayered power inductor according to the exemplary embodiment of the present invention includes a dielectric oxide without reaction with ferrite. The DC-bias characteristics may be improved by maximally suppressing the diffusion with the body using the trivalent and tetravalent dielectric oxide rather than the existing ferrite, as the gap composition that is the non-magnetic body.

The trivalent or tetravalent dielectric oxide according to the exemplary embodiment of the present invention may be one or more selected from a group consisting of $Al_2O_3$, $TiO_2$, $ZrO_2$, $SnO_2$, and $CeO_2$.

Figure 5:
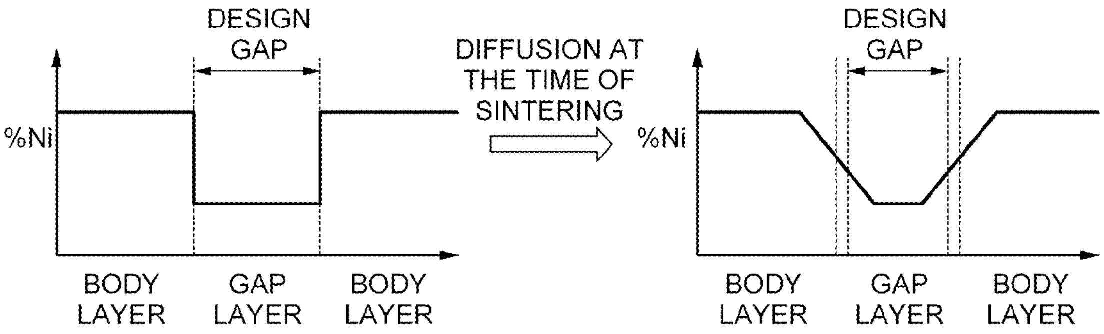
FIG. 5 is a diagram showing modeling relating to diffusion when sintering a circumference of a multilayered power inductor gap.
Figure 6:
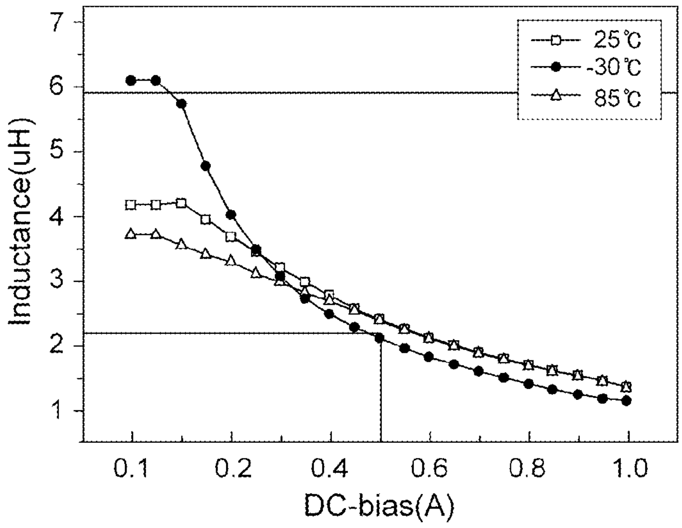
FIG. 6 is a diagram showing TCL characteristics when the gap using a ferrite material is used.

When the ferrite material is used as the gap layer according to the related art, the change in thickness of the gap layer is increased after being sintered, as shown in FIG. 5. It is observed that the TCL characteristics (change rate of inductance) of products are increased according to temperature due to the large increase in the thickness of the gap layer according to the above-mentioned change in temperature (FIG. 6). Therefore, it is not preferred to use the multilayered power inductor including the gap layer in various temperature ranges.

Figure 7:
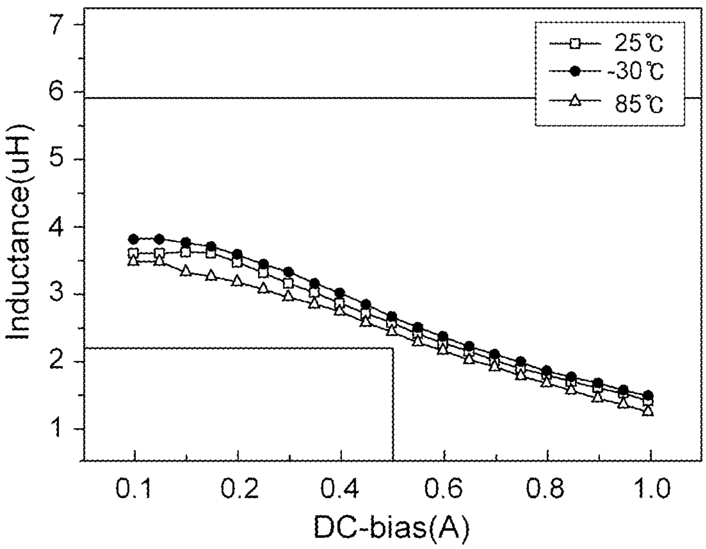
FIG. 7 is a diagram showing TCL characteristics when the gap using a dielectric material is used.

However, as in the exemplary embodiment of the present invention, when the gap layer is formed using the trivalent or tetravalent dielectric oxide, the loss of thickness of the gap layer is removed since the diffusion phenomenon between the same material generated in the ferrite material is not present. In this case, the change in temperature changed inductance (TCL) characteristics of the product according to the temperature may be small (FIG. 7).

The related art uses the gap composition in which oxide materials of various metals such as Ti, Cu, Bi, Fe, or the like, are mixed, but the exemplary embodiment of the present invention has the excellent temperature characteristics while using the trivalent or tetravalent dielectric oxide alone.

In addition, according to the exemplary embodiment of the present invention, an average particle size of the dielectric oxide may be 0.01 to 0.1 μm and a specific surface area is 10.0 to 50.0 $m^2/g$. When the gap composition has the average particle size and the specific surface area of the dielectric oxide are provided, the exemplary embodiment of the present invention may be fired at low temperature to show advantageous effects.

According to the exemplary embodiment of the present invention, the dielectric oxide may be included at 20 to 70 wt % for the entire gap composition. When the content of the dielectric oxide is below 20 wt %, the thickness of the gap layer is thin after being printed and the dense film is not formed after being dried. Further, when the content of the dielectric oxide exceeds 70 wt %, the contents of dielectric resin and solvent is insufficient, thereby degrading the printability.

The gap composition according to the exemplary embodiment of the present invention is prepared into a paste type and may be applied by the printing method. The reason is suitable to selectively form the gap structure at the desired position.

Therefore, when the viscosity of the paste that is the gap composition according to the exemplary embodiment of the present invention has a range of 10 to 150 kcps, it is advantageous in securing the printability and the workability.

The gap composition of the multilayered power inductor according to the exemplary embodiment of the present invention may further include one or more selected from a group consisting of organic resin, solvent, and additives.

The organic resin is used to allocate the printability to the paste. For example, ethyl cellulose, acrylic, polyvinyl butyral, polyvinyl alcohol, nitro cellulose, phenol, urethane, polyester, rosin, melamine, and urea resin may be used alone or as a mixture thereof. The organic resin may be included as 5 to 20 wt % for the contents of the dielectric oxide.

In addition, as the solvent used for the gap composition, an alcoholic based solvent such as dihydroterpineol, dihydroterpinyl acetate, buthyl carbitol, buthyl carbitol acetate, texanol, mineral sprit, octanol, or the like; a ketone based solvent; a cellosolve based solvent; an ester based solvent; and an ether based solvent may be used alone or as a mixture thereof.

As other additives, drying layer physical property and rheology of the paste may be controlled by adding plasticizer, dispersant, or the like.

Hereinafter, preferred examples of the present invention will be described in detail. The following examples describe the present invention by way of example only and the scope of the present invention is not construed as being limited to the following examples. In addition, the following examples are described using specific compounds, but in even when equivalents thereof are used, it is apparent to those skilled in the art that the same or like effects are shown.

EXAMPLE 1

The gap composition in the paste type was prepared by adding 100 g of $ZrO_2$ powder (average particle size of 80 nm and specific surface of 20 $m^2/g$) (35 wt %), 10 g of ethyl cellulose as organic resin (3.5 wt %), a solvent, that is, 180 g of dihydroterpineol (60 wt %), and the rest plasticizer and dispersant. The viscosity of the gap composition was 100 kcps.

As shown in FIG. 2, the gap layer was applied to only in the area spaced apart from external electrodes formed at both sides of the body by about 100 μm by using the gap composition. The inner electrode used Ag and the body was formed by adding about 0.2 mol % of one or more additives selected from a group consisting of $Bi_2O_3$, CoO, and $TiO_2$ for every 100 mol % of NiZnCu ferrite.

The multilayered power inductor according to the exemplary embodiment of the present invention has a structure in which three sheets of the gap layer (15 μm) is formed between the bodies.

EXAMPLE 2

The gap composition in the paste type was prepared by adding 100 g of $TiO_2$ powder (average particle size of 30 nm and specific surface of 40 $m^2/g$) (30 wt %), 12 g of ethyl cellulose as organic resin (4 wt %), a solvent, that is, 190 g of dihydroterpineol and butyl carbitol (63 wt %), and the rest plasticizer and dispersant. The viscosity of the gap composition was 50 kcps.

As shown in FIG. 3, the multilayered power inductor was prepared by the same method as Example 1 except that the gap layer is partially applied only to the core area surrounded by the inner electrode by using the gap composition.

EXAMPLE 3

The gap composition in the paste type was prepared by adding 100 g of $Al_2O_3$ powder (average particle size of 100 nm and specific surface of 10 $m^2/g$) (45 wt %), 10 g of ethyl cellulose and polyvinyl butyral as organic resin, a solvent, that is, 95 g of dihydroterpinyl acetate, and the rest plasticizer and dispersant. The viscosity of the gap composition was 150 kcps.

As shown in FIG. 4, the multilayered power inductor was prepared by the same method as Example 1 except that the gap layer is partially applied to the same area in which inner electrodes at both sides are disposed by using the gap composition.

COMPARATIVE EXAMPLE 1

The gap layer was formed up to a portion in which the sheet prepared from the gap composition including ZnCu ferrite as main component contacts the external electrode as shown in FIG. 1. In addition, the body used the same component as Example 1 and has a structure in which three sheets of ZnCu ferrite gap layers (20 μm) were formed between the bodies.

EXPERIMENTAL EXAMPLE 1

Confirm Whether Gap layer is Delaminated

In the multilayered power inductor prepared according to Examples 1 to 3 and Comparative Example 1, whether the delamination of the gap layer was observed by the product appearance and the cross section analysis after being sintered and the observed results were shown in the following Table 1.

TABLE 1

| | Delamination Number (Defective Number/Total Number) |
|---|---|
| Example 1 | 0/20 |
| Example 2 | 0/20 |
| Example 3 | 0/20 |
| Comparative Example 1 | 3~20/20 |

As shown in the results of the above Table 1, it was confirmed that the gap layer is not delaminated in the multilayered power inductor of Examples 1 to 3 having the gap layer structure according to the present invention. However, it was confirmed that the plurality of gap layers are delaminated in the multilayered power inductor according to Comparative Example 1 of the related art. From the results, the problem where the gap layer is delaminated could be improved by appropriately controlling the gap layer structure as in the present invention.

EXPERIMENTAL EXAMPLE 2

Confirm Delamination Tendency for Spaced Distance of Gap Layer

In order to confirm the delamination tendency for the spaced distance from the external area of the gap layer, the spaced distance was set to be 50 μm and 200 μm, respectively, in Example 1 having a structure of FIG. 2 to form the gap layer and the delamination phenomenon was observed. The results were shown in the following Table 2.

TABLE 2

| A' Length | Delamination Number (Defective Number/Total Number) |
|---|---|
| 50 μm | 1/20 |
| 100 μm | 0/20 |
| 100 μm | 0/20 |

As shown in the results of Table 2, when a length of A' spaced apart from the external electrode is below 100 μm, the change in a length of A' may occur by the difference in cutting precision. As a result, the distance from the external electrode spaced apart from the gap layer is short, such that the delamination defect may occur. Therefore, it is the most preferable to form the gap layer at a position spaced by about 100 μm or more from the external electrode.

EXPERIMENTAL EXAMPLE 3

Confirm Bias-TCL Characteristics

Figure 8:
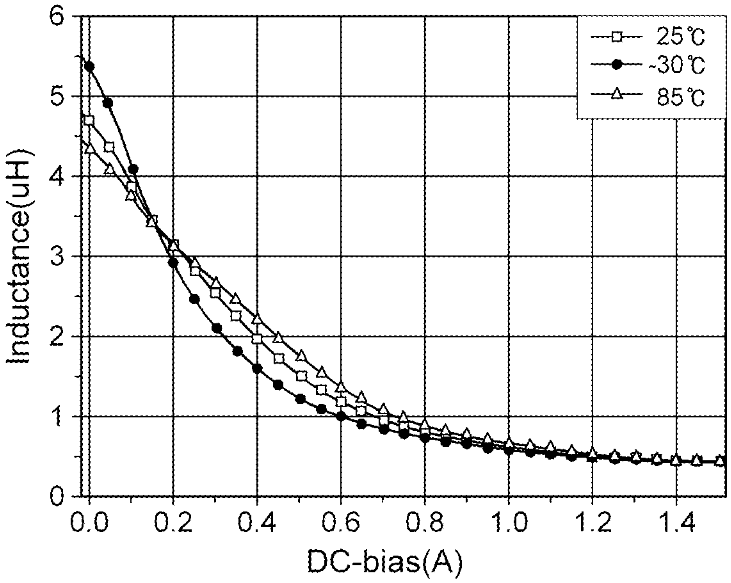
FIG. 8 is a DC-bias characteristic graph of the power inductor having a gap structure according to Comparative Example 1.
Figure 9:
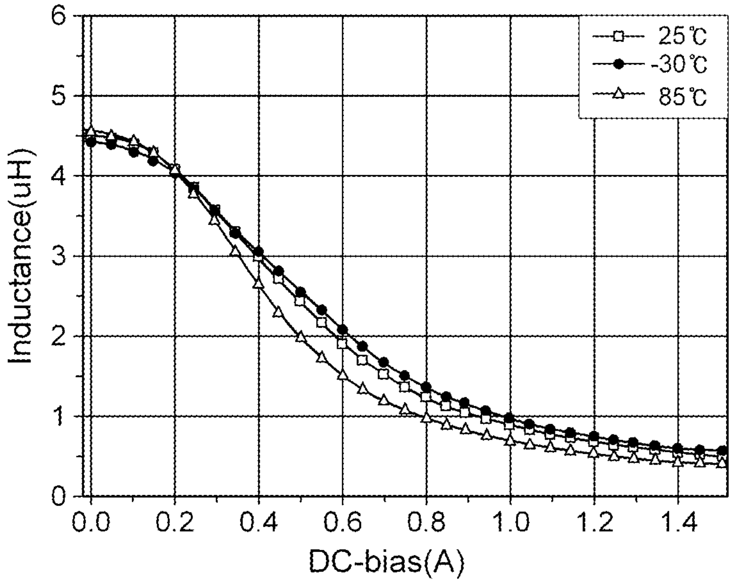
FIG. 9 is a DC-bias characteristic graph of the power inductor having a gap structure according to Example 1.

The bias-TCL characteristics of the multilayered power inductor prepared according to Comparative Example 1 and Example 1 was confirmed and the results were shown in FIGS. 8 and 9.

In the case of the multilayered power inductor prepared according to Comparative Example 1, it could be appreciated that the bias-TCL characteristics are very different according to temperature as shown in FIG. 8. That is, it could be appreciated that the difference in the initial inductance value is large according to temperature. This could be considered as the results of degrading the temperature characteristics by mutually diffusing the components used for the gap composition and the components used for the body in the related art.

However, reviewing the bias-TCL characteristic graph (FIG. 9) of the multilayered power inductor prepared by Example 1 of the present invention, it could be appreciated that the difference value in the characteristics is not shown. This may be generated from the results of making the thickness uniform by forming the gap composition using the trivalent or tetravalent dielectric oxide alone and printing the gap composition in the paste type and effectively limiting the diffusion of the unwanted components between the gap layer and the body layer by partially forming the gap composition within the area in which external electrodes formed at both sides of the body do not contact each other.

As set forth above, the exemplary embodiment of the present invention has a multilayered power inductor structure including a new gap layer, wherein the gap layer is disposed so as to be spaced apart from each other at a predetermined interval so that the external electrodes disposed at both ends of the body do not substantially contact the surface of the chip or is disposed between the inner electrodes or at the same position as the inner electrode interval, thereby solving the delamination problem of the gap layer.

In addition, the exemplary embodiment of present invention can prepare tetravalent or tetravalent dielectric oxide as the gap composition into the paste type and applies the gap layer structure thereto, thereby facilitating the structural design and the thickness control of the gap layer as compared with the case of forming the gap layer in the sheet shape of the related art and improving the DC-bias characteristics by maximally suppressing the diffusion with the body.

The multilayered power inductor having the gap layer structure according to the exemplary embodiment of the present invention reduces the change rate of inductance due to the change in temperature to improve the bias-TCL characteristics, which can be widely used for various materials requiring the characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A gap composition of a multilayered power inductor using dielectric oxide of trivalent or tetravalent metal oxide that does not react with ferrite, wherein an average particle size of the dielectric oxide is 0.01 to 0.1 μm and a specific surface area is 10.0 to 50.0 $m^2/g$, wherein the dielectric oxide is included in an amount of 20 to 70 wt % in the overall gap composition, and wherein the dielectric oxide of trivalent or tetravalent metal oxide is included alone in the gap composition as a dielectric oxide.

2. The gap composition according to claim 1, wherein the dielectric oxide is one or more selected from a group consisting of $TiO_2$, $ZrO_2$, $SnO_2$, and $CeO_2$.

3. The gap composition according to claim 1, wherein the gap composition is a paste type.

4. The gap composition according to claim 3, wherein the viscosity of the paste is 10 to 150 kcps.

5. The gap composition according to claim 1, further comprising one or more selected from a group consisting of organic resin, solvent, and additives.

* * * * *